United States Patent
Tanz

(10) Patent No.: US 9,776,796 B2
(45) Date of Patent: Oct. 3, 2017

(54) SYSTEM AND METHOD FOR DESTACKING AND CONVEYING ARTICLES ARRANGED IN STACKS

(71) Applicant: SIEMENS AKTIENGESELLSCHAFT, Munich (DE)

(72) Inventor: Torsten Tanz, Hilzingen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/901,252

(22) PCT Filed: Jun. 20, 2014

(86) PCT No.: PCT/EP2014/063007
§ 371 (c)(1),
(2) Date: Dec. 28, 2015

(87) PCT Pub. No.: WO2014/206874
PCT Pub. Date: Dec. 31, 2014

(65) Prior Publication Data
US 2016/0280464 A1    Sep. 29, 2016

(30) Foreign Application Priority Data
Jun. 27, 2013   (DE) .................. 10 2013 212 423

(51) Int. Cl.
*B65G 15/58*  (2006.01)
*B65G 59/12*  (2006.01)
(Continued)

(52) U.S. Cl.
CPC ............. *B65G 15/58* (2013.01); *B65G 15/24* (2013.01); *B65G 37/00* (2013.01); *B65G 43/00* (2013.01); *B65G 59/12* (2013.01); *B65G 2201/02* (2013.01)

(58) Field of Classification Search
CPC ............................... B65G 15/18; B65G 59/12
(Continued)

(56) References Cited

U.S. PATENT DOCUMENTS 3,291,282 A * 12/1966 Pedagno ................... B07C 1/04
198/550.4
3,592,329 A * 7/1971 Fleischauer ........ B65G 21/2036
198/370.12
(Continued)

FOREIGN PATENT DOCUMENTS

CN      1163228 A    10/1997
CN      2628498 Y    7/2004
(Continued)

*Primary Examiner* — Douglas Hess
(74) *Attorney, Agent, or Firm* — Laurence Greenberg; Werner Stemer; Ralph Locher

(57) ABSTRACT

A system and a method for destacking and conveying articles disposed in stacks include a conveying device which is constructed for transporting the articles in a conveying direction. The conveying device is inclined relative to the horizontal at an angle of inclination and has a drive device and adhesion elements. The adhesion elements exert an adhesion force on articles with which they are in contact. The system also includes a controller which is connected to the drive device of the conveying device. In order to provide for more effective destacking for the system and the method, the adhesion elements are connected to the controller and constructed to be activated by the controller.

14 Claims, 2 Drawing Sheets

(51) Int. Cl.
*B65G 15/24* (2006.01)
*B65G 37/00* (2006.01)
*B65G 43/00* (2006.01)

(58) Field of Classification Search
USPC ............................... 198/688.1, 689.1, 690.1
See application file for complete search history.

(56) References Cited

U.S. PATENT DOCUMENTS

| | | | |
|---|---|---|---|
| 4,757,985 A * | 7/1988 | Hamant | B65H 1/025 271/146 |
| 5,413,323 A * | 5/1995 | Imbert | B07C 1/025 271/105 |
| 5,641,052 A | 6/1997 | Lazzarotti et al. | |
| 6,058,845 A | 5/2000 | Kelm | |
| 6,253,924 B1 * | 7/2001 | Bleifuss | B03C 1/16 198/821 |
| 6,277,276 B1 * | 8/2001 | Bratten | B01D 29/096 210/222 |
| 6,325,927 B1 * | 12/2001 | Green | B03C 1/18 198/690.1 |
| 6,491,154 B2 | 12/2002 | Ydoate et al. | |
| 7,171,881 B2 * | 2/2007 | Ripley | B65H 29/242 83/113 |
| 8,695,784 B2 * | 4/2014 | Ota | B65G 15/32 198/459.6 |
| 8,776,994 B2 * | 7/2014 | Ozaki | B65G 15/58 198/690.1 |
| 8,991,593 B2 * | 3/2015 | Shinobu | B65G 17/24 198/779 |
| 2012/0305368 A1 | 12/2012 | Ozaki | |

FOREIGN PATENT DOCUMENTS

| | | |
|---|---|---|
| DE | 102010042753 A1 | 4/2012 |
| DE | 102012104562 A1 | 12/2012 |
| JP | H0891577 A | 4/1996 |
| JP | H08169553 A | 7/1996 |
| JP | 2000014175 A | 1/2000 |
| JP | 2005225617 A | 8/2005 |

* cited by examiner

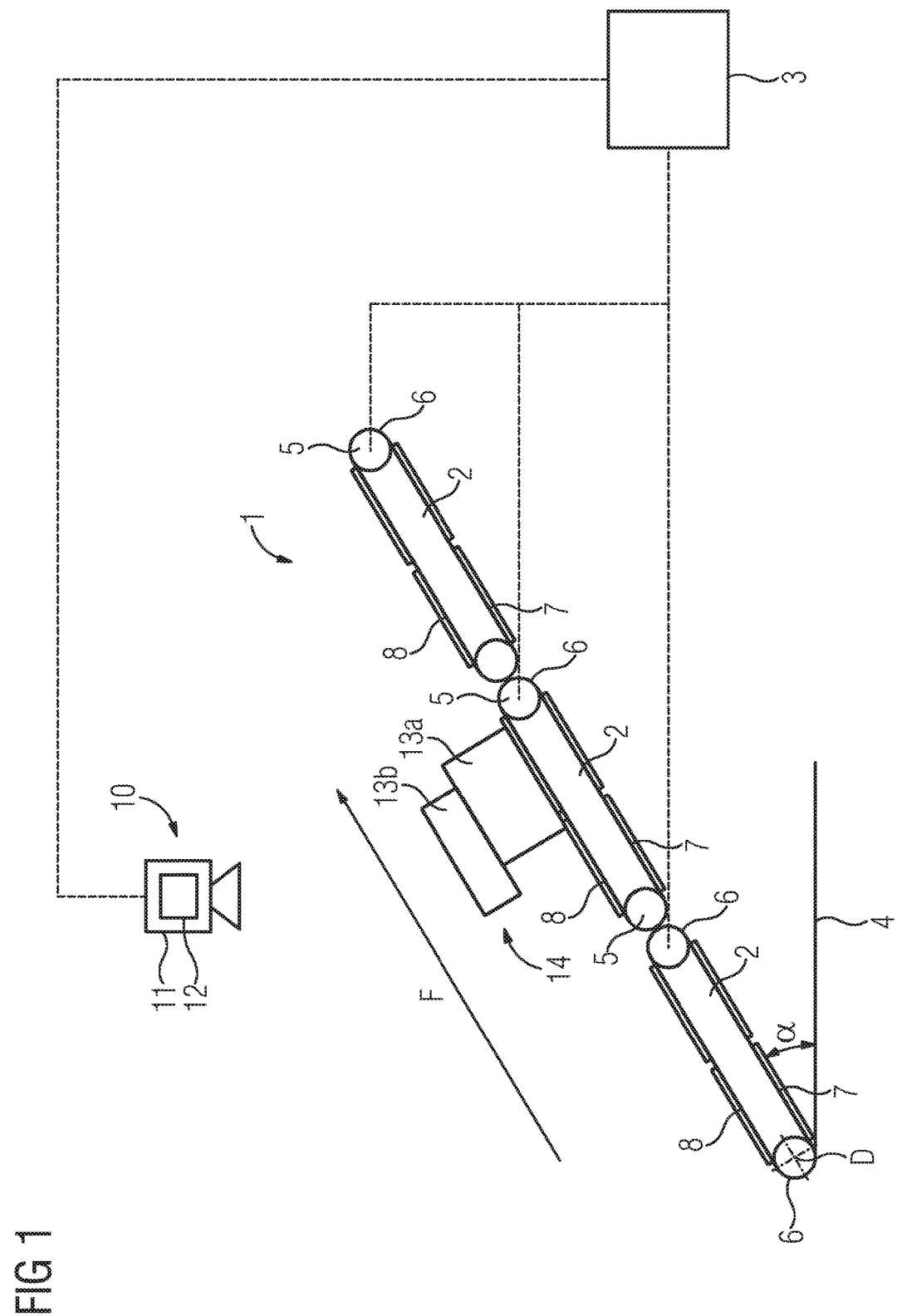

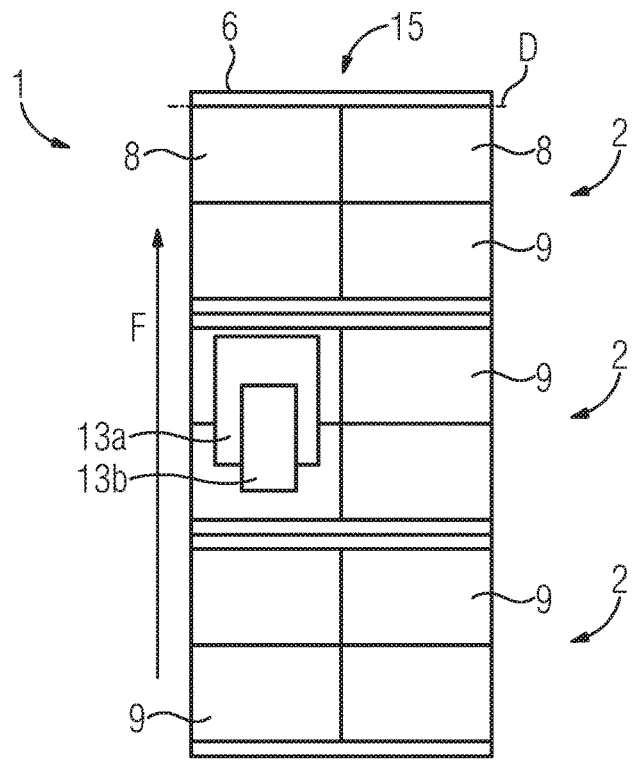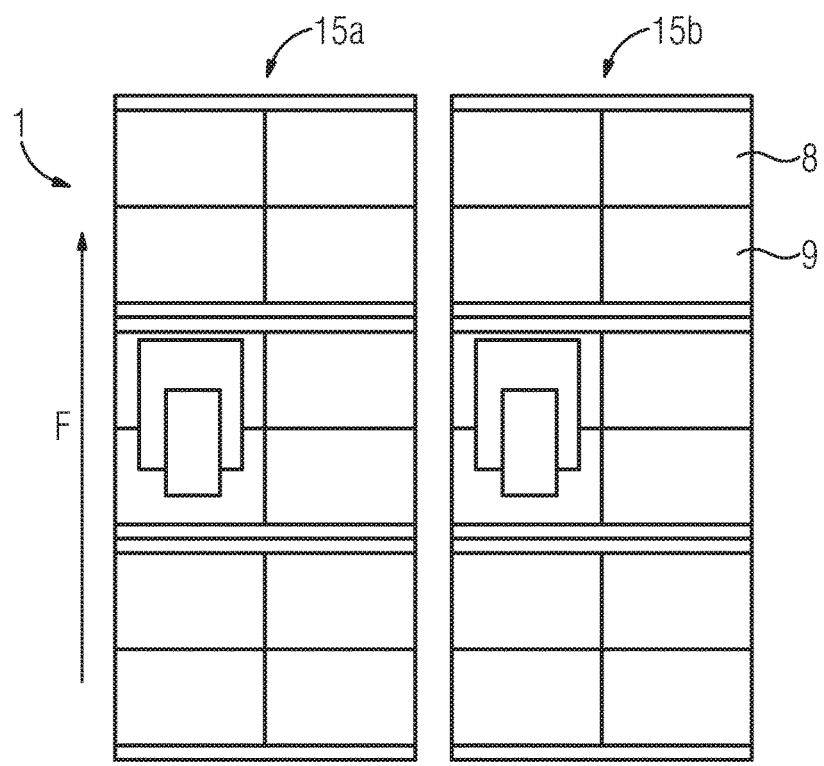

SYSTEM AND METHOD FOR DESTACKING AND CONVEYING ARTICLES ARRANGED IN STACKS

BACKGROUND OF THE INVENTION

FIELD OF THE INVENTION

The invention relates to a system for destacking and conveying articles arranged in stacks, with a conveying means which is designed for transporting the articles in a conveying direction which is inclined relative to a horizontal at an angle of inclination and has a drive means and adhesion elements, wherein the adhesion elements exert an adhesion force on articles which are in contact, and with a controller which is connected to the drive means of the conveying means.

The invention further relates to a method for destacking and conveying articles arranged in stacks, in which the articles are first arranged on a conveying means running in the conveying direction, the articles are conveyed by the conveying means in the conveying direction at an angle of inclination to the horizontal, during the conveying the articles in contact with adhesion elements on the conveying means are held at least for a time and are sorted from the other articles.

To increase throughput and to simplify conveyor technology there is increasingly a transition from the method of individual article handling to the method of bulk handling of articles, especially for packaged articles. Bulk handling in the context means that the articles are handled practically as bulk articles in a so-called three-dimensional flow. For packaged articles of the courier, express post and parcel industry the dimensions, weights, shapes and surfaces are extremely inhomogeneous. Despite this these articles must be separated from a three-dimensional flow into a flow of separated individual articles in order to be able to sort the articles effectively. To this end a two-dimensional flow, the so-called flat flow, is created from the three-dimensional flow, the volume or bulk flow, so that where possible articles no longer lie above one another. This process is referred to as vertical separation or destacking. The destacked articles may no longer lie above one another, even just partly, in relation to the base surface. The destacking is followed by a horizontal separation, i.e. the creation of a one-dimensional flow from the two-dimensional flow. Systems or methods described at the start are known from the prior art. With the known systems the destacking is especially carried out by a cascaded arrangement of a number of rising and falling continuous conveyors. Systems and methods from the prior art are described for example in U.S. Pat. Nos. 6,491,154 or 5,641,052.

BRIEF SUMMARY OF THE INVENTION

The underlying object of the invention is to provide an improved system and an improved method compared to the prior art, with which the destacking of articles can be carried out more effectively.

The system mentioned at the start achieves the object by adhesion elements being connected to the controller and being embodied so as to be able to be activated by the controller.

The method mentioned at the start achieves the object by the adhesion elements being able to be activated and deactivated by a controller.

The advantage of the inventive solution is that the explicit activation of the adhesion elements exerts an additional normal force on the articles lying directly on the conveying means. A jolting of the articles lying right at the bottom can be achieved by an intermittent switching on and switching off of the adhesion elements, which leads to a positive movement of the articles lying on top of them and leads to further positive separation effects. The inventively more effective destacking enables the system or the entire sorting plant to be embodied in a more space-saving manner and the separation effects caused by the invention can be employed in a controllable way.

The inventive solution can be further developed by advantageous forms of embodiment, which are able to be combined independently of one another.

Thus the adhesion elements can be embodied to be electrically-activatable. The advantage of this is that activation by the controller is especially easy and the adhesion elements are able to be easily integrated into known conveying means, such as belt conveyors, chain link conveyors and roller conveyors for example. In such cases the adhesion elements are especially embodied as electrostatic adhesion elements, which create a sufficient adhesion force and are technically easy to use.

So that the articles right at the top slide down more easily from the articles lying at the bottom, the angle of inclination can be greater than 18°. This enables the angle of inclination to be embodied larger than in prior-art destacking systems.

In an advantageous embodiment the adhesion elements can form adhesion sections, wherein the adhesion sections are able to be activated independently of one another. The advantage of this is that the adhesion sections, which can be arranged after one another in the conveying direction or next to one another transverse to the conveying direction, can be activated or deactivated as a function of the occupancy of the conveying means with articles.

In a development of the invention the device can have a number of conveying means arranged behind one another or next to one another, which each have adhesion elements, wherein the adhesion elements of different conveying means are able to be controlled independently of one another by the controller.

The advantage of this is that the adhesion elements at different conveying means can be controlled differently, whereby the destacking can be designed even more efficiently.

In order to achieve additional separation effects, the drive means can drive the conveying means at different conveying speeds.

The system can also have a sensor unit for determining a distribution of articles, wherein the controller controls the adhesion elements as a function of the article distribution determined. Thus for example the destacking can be regulated by means of the adhesion elements as a function of the occupancy of the belt.

In an advantageous embodiment of the inventive method the adhesion elements can be activated and deactivated electrically by the controller. In this way the inventive method is able to be implemented in a technically simple way. For destacking the adhesion elements are deactivated for fractions of seconds, i.e. for a period of less than one second.

Furthermore a distribution of articles on the conveying means can be determined and the adhesion elements can be activated as a function of the article distribution, in order to control the destacking measures as a function of the occupancy of the conveying means.

BRIEF DESCRIPTION OF THE SEVERAL VIEWS OF THE DRAWING

The invention is explained below with reference to the exemplary embodiments in the enclosed drawings, in which:

FIG. 1 shows a schematic diagram of a form of exemplary embodiment of the inventive system in a side view, FIG. 2 shows a schematic diagram of the form of embodiment depicted in FIG. 1 in an overhead view FIG. 3 shows a schematic diagram of a further form of exemplary embodiment of the inventive system in an overhead view

DESCRIPTION OF THE INVENTION

First of all the invention will be explained on the basis of the form of exemplary embodiment in FIGS. 1 and 2.

The system 1 comprises three conveyor belts 2 as conveying means and a controller 3, which is connected to each of the conveyor belts for control purposes.

The conveyor belts 2 are arranged cascaded behind one another in the conveying direction F and each run at an angle of inclination α to the horizontal 4. The angle of inclination α in the form of embodiment in FIG. 1 amounts to 18°. The conveyor belts 2 are essentially arranged flush with one another in the form of exemplary embodiment shown, wherein they can also be arranged as an alternative with an offset, as is known from the prior art. Likewise as an alternative the angle of inclination of the conveyor belts 2 in relation to one another can also differ.

The conveyor belts 2 are essentially embodied identically and each comprise a drive means 5, deflection rollers 6, a belt conveyor 7 and adhesion elements 8.

The deflection rollers 6 are arranged with an axis of rotation D transverse to the conveying direction F and in parallel to one another. The belt conveyor 7 runs endlessly around the two deflection rollers 6. Between the deflection rollers 6 the belt conveyor 7 runs at the angle of inclination α to the horizontal 4. The drive means 5 is connected to one of the deflection rollers 6 in order to drive the deflection roller 6. The drive means 5 is an electric motor for example, which can also be integrated into the deflection roller 6. The electric motor is connected to the deflection roller via a suitable transmission. The drive means 5 is connected to the controller 3 for signaling purposes and is controlled by the controller.

In the form of exemplary embodiment shown by way of example in FIG. 1 the adhesion elements 8 are integrated into the belt conveyors 7. The adhesion elements 8 in this case form adhesion sections 9. The adhesion elements 8 are each connected to the controller and are able to be activated or deactivated by the controller. The adhesion elements 8 of an adhesion section 9 can be activated simultaneously by the controller 3 and can be activated independently of adhesion elements 8 in another adhesion section 9. The adhesion sections 9 in the form of embodiment depicted in FIG. 1 and FIG. 2 are embodied essentially rectangular and adjoin one another. Thus each belt conveyor 7 is embodied with its entire surface covered by adhesion elements 8, so that articles 13 can be held everywhere.

The adhesion elements 8 are integrated into the belt conveyors 7 in the form of embodiment depicted in FIGS. 1 and 2. The adhesion elements 8 are embodied as electrostatic adhesion elements 8 having electrodes (not shown), which are arranged in the belt conveyors and can be activated and controlled by the controller. In this case the electrodes of the adhesion elements 8 are connected by cables (not shown) to the controller 3. In order to route the cabling from the controller 3 in its fixed position to the movable belt conveyors 7, sliding contacts or similar technical solutions are used for example.

The system 1 further comprises a sensor unit 10 arranged above the conveyor belts 2. The sensor unit 10 is connected to the controller 3 for signaling purposes and has an image-recording device 11 and an evaluation unit 12. The image-recording device 11, for example a camera or a 3D laser scanner, is arranged above the conveyor belts 2 so that it can detect all articles 13 which are located on the conveyor belts 2.

For reasons of presentation the sensor unit 10 and the controller 3 are only shown in the side view in FIG. 1.

The function of the inventive system 1 in the form of embodiment depicted in FIGS. 1 and 2 is described below.

First of all a bulk concentration 14 of articles 13 is positioned on one of the conveyor belts 2. In the schematic diagram depicted in FIG. 1 the bulk 14 only consists of two articles 13, which are packages for example. In practice larger quantities of articles would of course usually be discharged onto the system 1.

Subsequently the articles 13a lying right at the bottom which are directly in contact with the belt conveyors 7 are conveyed by the conveyor belts 2 in the conveying direction F. The conveyor belts 2 are permanently driven, provided no congestion of articles 13 occurs in the following process. So that the articles 13 lying right at the bottom do not slip off the inclined conveyor belt 2 against the conveying direction F, the adhesion elements 8 are activated by the controller 3. The adhesion elements 8, which are in contact with the articles 13a, exert an additional normal force on the articles 13a. Through this force the articles 13a are held on the relatively steep conveyor belt 2 and are conveyed by the belt conveyors 7 in the conveying direction F. Through the adhesion elements 8 the articles 13a are held so well on the belt conveyors 7 that a considerably steeper angle of inclination α can be set than with systems without adhesion elements. In this way a destacking is achieved, since through the steeper angle of inclination α many articles 13b lying at the top fall off the articles 13a lying right at the bottom solely through the force of gravity. Despite this it can occur that articles 13b, by getting hooked up for example, remain on the articles 13a lying right at the bottom and are not destacked. The articles 13a, 13b stacked above one another are detected by the sensor unit 10.

In this case the image-recording unit 1 records images of the occupancy of the conveyor belts by the articles 13. The images are evaluated by the evaluation unit 12 so that a parameter characteristic of the article distribution is determined and is transmitted to the controller 3.

Furthermore a separate parameter for each adhesion section 9 is determined and transmitted. Thus the controller 3 receives from the sensor unit 10 information about the distribution of articles on the conveyor belts 2 for each adhesion section 9. On the basis of the article distribution the controller 3 knows whether there are stacked articles 13b located on the conveyor belts 2.

If there are such articles, as shown in FIG. 1, the controller 3 briefly deactivates the adhesion elements 8 of the adhesion section 9 in which the article 13a is located. This means that the holding force of the adhesion elements 8 on the article 13a is absent, so that said article slips downwards during the deactivation against the conveying direction F onto the conveyor belt 2. However the slippage is only brief, because the controller activates the adhesion elements 8 again after fractions of seconds and thus fixes the article 13a to the belt conveyor again. The brief deactivation of the adhesion elements 8 and the slippage of the article 13*a* lying right at the bottom exerts a jolt on the article 13*b* lying at the top. This imparts movement to the article 13*b* relative to the lower article 13*a*, causing it to slip further and it is thus destacked.

The destacked articles 13, which now form a two-dimensional flow, are conveyed with permanently-activated adhesion elements to the end of the system 1 and are handed over there for further processing to the subsequent sorting process.

The further form of embodiment depicted in FIG. 3 is described below. For the sake of simplicity only differences from the form of embodiment in FIGS. 1 and 2 are discussed.

The system 1 in FIG. 3 comprises two conveyor sections 15*a*, 15*b* lying alongside one another, which each correspond to the form of embodiment consisting of only one conveyor section 15 depicted in FIG. 2.

The two conveyor sections 15*a*, 15*b* are able to be controlled separately by the controller 3 (not shown). This enables one conveyor section 15*a*, 15*b* to be switched off if required or specific sorting effects, such as turning the articles 13 or similar for example, to be achieved by different speeds.

The invention claimed is:

1. A system for destacking and conveying articles disposed in stacks, the system comprising:
a conveyor constructed for transporting the articles in a conveying direction, said conveyor being inclined relative to the horizontal at an angle of inclination and said conveyor having a drive and adhesion elements; and
a controller connected to said drive of said conveyor;
said adhesion elements at least temporarily exerting an adhesion force on articles contacted by said adhesion elements and said adhesion elements being connected to said controller and being configured to be deactivated by said controller causing the articles to slip downward onto said conveyor against the conveying direction for destacking the articles.

2. The system according to claim 1, wherein said adhesion elements electrically activatable.

3. The system according to claim 1, wherein said angle of inclination is greater than 18°.

4. The system according to claim 1, wherein said drive drives said conveyor at different conveying speeds.

5. The system according to claim 1, wherein said adhesion elements exert the adhesion force on metallic and non-metallic articles.

6. The system according to claim 1, wherein said adhesion elements are electrostatic adhesion elements electrically connected to said controller.

7. The system according to claim 1, wherein said conveyor has a surface for transporting the articles, and said surface is entirely covered by said adhesion elements.

8. A system for destacking and conveying articles disposed in stacks, the system comprising:
a conveyor constructed for transporting the articles in a conveying direction, said conveyor being inclined relative to the horizontal at an angle of inclination and said conveyor having a drive and adhesion elements; and
a controller connected to said drive of said conveyor;
said adhesion elements at least temporarily exerting an adhesion force on articles contacted by said adhesion elements, said adhesion elements being connected to said controller and being configured to be activated and deactivated by said controller for destacking the articles, said adhesion elements forming adhesion sections, and said adhesion sections being activatable independently of one another.

9. A system for destacking and conveying articles disposed in stacks, the system comprising:
a plurality of conveyors disposed at least one of after one another or next to one another, said plurality of conveyors being constructed for transporting the articles in a conveying direction, said plurality of conveyors being inclined relative to the horizontal at an angle of inclination, said plurality of conveyors each having a drive and said plurality of conveyors each including adhesion elements; and
a controller connected to said drives of said conveyors;
said adhesion elements exerting an adhesion force on articles contacted by said adhesion elements, said adhesion elements being connected to said controller and being configured to be activated by said controller, and said adhesion elements of different conveyors being controllable independently of one another by said controller.

10. A system for destacking and conveying articles disposed in stacks, the system comprising:
a conveyor constructed for transporting the articles in a conveying direction, said conveyor being inclined relative to the horizontal at an angle of inclination and said conveyor having a drive and adhesion elements;
a controller connected to said drive of said conveyor;
said adhesion elements exerting an adhesion force on articles contacted by said adhesion elements and said adhesion elements being connected to said controller and being configured to be activated by said controller; and
a sensor for determining a distribution of the articles, said controller activating said adhesion elements as a function of a determined article distribution.

11. A method for destacking and conveying articles disposed in stacks, the method comprising the following steps:
providing adhesion elements on a conveyor running in a conveying direction
depositing articles on the conveyor;
using the conveyor to convey the articles in the conveying direction at an angle of inclination relative to the horizontal;
during the conveying step, using the adhesion elements to at least temporarily hold the articles in contact with the adhesion elements and destack the articles from other articles; and
using a controller to deactivate the adhesion elements causing the articles to slip downward onto the conveyor against the conveying direction for destacking the articles.

12. The method according to claim 11, which further comprises providing the conveyor with a surface for transporting the articles, and entirely covering the surface with the adhesion elements.

13. A method for destacking and conveying articles disposed in stacks, the method comprising the following steps:
providing adhesion elements on a conveyor running in a conveying direction
depositing articles on the conveyor;
using the conveyor to convey the articles in the conveying direction at an angle of inclination relative to the horizontal;

during the conveying step, using the adhesion elements to at least temporarily hold the articles in contact with the adhesion elements and destack the articles from other articles;

using a controller to electrically activate and deactivate the adhesion elements; and deactivating the adhesion elements by using the controller for a period of less than one second for destacking the articles.

14. A method for destacking and conveying articles disposed in stacks, the method comprising the following steps:

providing adhesion elements on a conveyor running in a conveying direction depositing articles on the conveyor;

using the conveyor to convey the articles in the conveying direction at an angle of inclination relative to the horizontal;

during the conveying step, using the adhesion elements to at least temporarily hold the articles in contact with the adhesion elements and destack the articles from other articles;

using a controller to electrically activate and deactivate the adhesion elements;

determining a distribution of the articles on the conveyor, and activating the adhesion elements as a function of the article distribution.

\* \* \* \* \*